(12) United States Patent
Kasahara

(10) Patent No.: US 6,775,074 B2
(45) Date of Patent: Aug. 10, 2004

(54) IMAGE PICKUP LENS, AND IMAGE PICKUP SYSTEM USING THE SAME

(75) Inventor: Takashi Kasahara, Tachikawa (JP)

(73) Assignee: Olympus Corporation, Tokyo (JP)

( * ) Notice: Subject to any disclaimer, the term of this patent is extended or adjusted under 35 U.S.C. 154(b) by 2 days.

(21) Appl. No.: 10/305,090

(22) Filed: Nov. 27, 2002

(65) Prior Publication Data

US 2003/0103267 A1 Jun. 5, 2003

(30) Foreign Application Priority Data

Nov. 28, 2001 (JP) ........................................ 2001-362268

(51) Int. Cl.[7] .............................. G02B 9/34; G02B 13/02
(52) U.S. Cl. ...................... 359/781; 359/747; 359/683; 359/784
(58) Field of Search ................................ 359/686, 771, 359/660, 644, 747, 781, 784, 715, 683

(56) References Cited

U.S. PATENT DOCUMENTS

| | | | | |
|---|---|---|---|---|
| 5,184,251 A | * | 2/1993 | Tsuchida et al. | 359/654 |
| 5,274,504 A | * | 12/1993 | Itoh | 359/676 |
| 5,406,416 A | * | 4/1995 | Ohtake | 359/686 |
| 6,657,791 B2 | * | 12/2003 | Nishimura | 359/686 |

FOREIGN PATENT DOCUMENTS

| | | |
|---|---|---|
| JP | 9-189856 | 7/1997 |
| JP | 11-095096 | 4/1999 |

* cited by examiner

Primary Examiner—Scott J. Sugarman
Assistant Examiner—M. Hasan
(74) Attorney, Agent, or Firm—Pillsbury Winthrop LLP

(57) ABSTRACT

A compact optical system includes a reduced number of lens elements with a bendable optical path and so is compatible with miniature image pickup devices. The image pickup lens includes, in order from its object side, a first lens element having a negative refracting power, a second lens element having positive refracting power, a stop, a third lens element having a negative refractive power and a fourth lens element having positive refracting power, and satisfies the following conditions (1) and (2)

$$50 > v_{d1} - v_{d2} > 10 \quad (1)$$

$$2 > f/f3 > 0.35 \quad (2)$$

where $v_{d1}$ is the d-line reference Abbe number of the first lens element, $v_{d2}$ is the d-line reference Abbe number of the second lens element, f is the focal length of the image pickup lens, and f3 is the composite focal length of the third and fourth lens elements. Between the first and the second lens element there is interposed a reflecting surface.

20 Claims, 8 Drawing Sheets

IMAGE PICKUP LENS, AND IMAGE PICKUP SYSTEM USING THE SAME

This application claims benefit of Japanese Application No. 2001-362268 filed in Japan Nov. 28, 2001, the contents of which are incorporated by this reference.

BACKGROUND OF THE INVENTION

The present invention relates generally to an image pickup lens and an image pickup system comprising the same, and more particularly to an image pickup optical system best suited for miniature image pickup systems used with cellular phones, etc.

An optical system for miniature image pickup systems used with cellular phones, etc. must have a wide view angle and be as small and thin as possible while the necessary back focus is kept. An image pickup device used on such miniature image pickup systems becomes steadily small and definite, and the associated optical system must have a resolving power consistent therewith.

In such an optical system for miniature image pickup systems, the focal length of an image pickup system becomes short by virtue of image pickup device size. While that optical system must be as small and thin as possible, there is a certain limit to thickness reductions by reducing the number of lenses used. If the optical system is turned back somewhere, then much more thickness reductions are achievable. To cut back on the cost of such an optical system, the number of lenses used should preferably be as small as possible.

With an optical system having such short a focal length, however, it is difficult to make correction for chromatic aberration of magnification and obtain sufficient resolving power as far as off-axis areas, using a reduced number of lenses.

With a conventional five-lens arrangement like an image pickup lens set forth in JP-A 09-189856, it is possible to obtain satisfactory resolution over a wide view angel. However, that arrangement is expensive by virtue of too many lens elements, and compactness is difficult to achieve because the overall length of the lens system tends to become long. To bend an optical path, there must be large space for such bending; however, the increased number of lens elements makes it difficult to ensure large space.

The image pickup lens set forth in JP-A 11-95096 is made up of four lens elements, providing a wide-aperture, wide-angle image pickup lens system. As the focal length of such an arrangement is further reduced, however, it is difficult to correct chromatic aberration of magnification and it is impossible to obtain adequate resolving power as far as off-axis areas.

SUMMARY OF THE INVENTION

In view of such problems with the prior art, an object of the present invention is to provide a compact optical system that is made up of a reduced number of lens elements with a bendable optical path and so is compatible with miniature image pickup equipments used with cellular phones, etc.

According to the present invention, this object is achieved by the provision of an image pickup lens, characterized by comprising, in order from an object side thereof, a first lens element having negative refracting power, a second lens element having positive refracting power, a stop, a third lens element having negative refracting power and a fourth lens element having positive refracting power, wherein lens elements having refracting power due to refraction are defined only by said first to fourth lens elements and the following conditions (1) and (2) are satisfied:

$$50 > \nu_{d1} - \nu_{d2} > 10 \tag{1}$$

$$2 > f/f_3 > 0.35 \tag{2}$$

where $\nu_{d1}$ is the d-line reference Abbe number of the first lens element, $\nu_{d2}$ is the d-line reference Abbe number of the second lens element, f is the focal length of the image pickup lens, and $f_3$ is the composite focal length of the third and fourth lens elements.

In what follows, why the aforesaid arrangement is used, and how the same works is explained.

With the lens arrangement of the present invention, it is possible to make adequate correction for chromatic aberration of magnification while making sure of a back focus at a short focal length, using as small as four lens elements. With the second lens element located on the image side of the image pickup lens with respect to the stop, no chromatic aberration of magnification can be corrected even when the Abbe number of the second lens element is kept small. To slim down the optical system, the optical path must be bent between lens elements located as close to an object as possible. With the lens arrangement of the present invention, however, it is possible to make the space between the first lens element and the second lens element so wide that the lens system can be bent with no deterioration of aberrations.

In the present invention, chromatic aberration of magnification is corrected by reducing the Abbe number of the second lens element located on the object side with respect to the stop. Condition (1) gives a definition of the difference in Abbe number between the first lens element and the second lens element. As the lower limit of 10 to this condition is not reached, it is impossible to make adequate correction for the chromatic aberration of magnification. Because there is some limit to the Abbe numbers of optical glasses, combinations of optical glasses that exceed the upper limit of 50 are hardly available.

To make sure of the back focus at a short focal length, the optical system must be of the retrofocus type wherein the object side thereof is constructed of a lens element having negative refracting power and the image side thereof is made up of a lens element having positive refracting power. To make the focal length short as contemplated herein, the negative refracting power and positive refracting power must be much more increased. Condition (2) gives a definition of the ratio of the focal length of the image pickup lens to the composite focal length of the third and fourth lens elements. As the lower limit of 0.35 to this condition is not reached, it is difficult to make sure of any back focus, and as the upper limit of 2 is exceeded, the composite focal length of the third and fourth lens elements becomes too short for correction of aberrations.

In the image pickup lens of the present invention, the third and fourth lens elements may be cemented together.

While the third and fourth lens elements may be constructed as separate, individual lens elements, it is understood that if they are positioned at a narrow space, it is possible to make better correction for chromatic aberrations. Further, if the third lens element having negative refracting power is cemented to the fourth lens element having positive refracting power, there is then obtained an arrangement favorable for fabrication because aberrations ensuing from mutual decentration of both lens elements can be held back.

Preferably in the present invention, the second lens element should be a positive meniscus lens element concave on its image side.

This is because when there is a wide space between the first lens element and the second lens element, it is easy to locate the principal point of the second lens element on the first lens element side.

Preferably in this case, the second lens element should comply with the following conditions (A) and (B).

$$0.45 > f/f_2 > 0.15 \quad (A)$$

$$-1.1 > (r_{21}+r_{22})/(r_{21}-r_{22}) > -10.0 \quad (B)$$

Here $f_2$ is the focal length of the second lens element, $r_{21}$ is the axial radius of curvature of the object-side surface of the second lens element, and $r_{22}$ is the axial radius of curvature of the image-side surface of the second lens element.

In consideration of a balance between correction of aberrations and size reductions, it is preferable that the refracting power and shape of the second lens element comply with the aforesaid conditions (A) and (B).

As the lower limit of 0.15 to condition (A) is not reached, it is necessary to move the first lens element toward the object side thereby making sure of a view angle and an F-number, and as the upper limit of 0.45 is exceeded, it is difficult to make sure of the space between the first lens element and the second lens element.

As the lower limit of −10.0 to condition (B) is not reached, meniscus shape becomes acute, making aberrations likely to occur, and as the upper limit of −1.1 is exceeded, the degree of movement of the principal point becomes small, producing unfavorable influences on making sure of the space between the first lens element and the second lens element.

Although depending on the arrangement used, it is also acceptable to comply with either one of conditions (A) and (B).

Preferably in the present invention, the first lens element complies with the following condition (C).

$$0.50 > f/f_1 > 0.15 \quad (C)$$

Here $f_1$ is the focal length of the first lens element.

While the retrofocus type arrangement enables the focal length to become short as already explained, it is then preferable that the first lens element having negative refracting power complies with the aforesaid condition (C).

At less than the lower limit of 0.15 to condition (C) or at greater than the upper limit of 0.50, it is impossible to reconcile the first lens element with the lenses located on the image side with respect thereto and, hence, it is difficult to make sure of any proper lens space or proper aberration correction capabilities.

Throughout the foregoing embodiments of the present invention, it is preferable to comply with the following conditions (3) and (4).

$$8 > dz/f > 4.5 \quad (3)$$

$$2.5 > d_{12}/d_{23} > 1 \quad (4)$$

Here $d_{12}$ is the axial distance from the image-side surface of the first lens element to the object-side surface of the second lens element, $d_{23}$ is the axial distance from the image-side surface of the second lens element to the object-side surface of the third lens element, and dz is the axial distance from the object-side surface of the first lens element to the image-side surface of the fourth lens element.

Condition (3) gives a definition of the ratio between the focal length of the optical system and the total length of the optical system. As the lower limit of 4.5 to this condition is not reached, it is impossible to secure any lens space sufficient for bending the optical system, and as the upper limit of 8 is exceeded, the total length of the optical system becomes too long, making its compactness impossible.

Condition (4) gives a definition of the rate between the space between the first and second lens elements and the space between the second and third lens elements. As the lower limit of 1 to this condition is not reached, it is impossible to bend the optical path at the space between the first lens element and the second lens element and, hence, to slim down the optical system. As the upper limit of 2.5 is exceeded, it is impossible to make the optical system compact because its total length becomes too long.

Preferably in the present invention, the image pickup lens should further comply with the following condition (5).

$$3 > d_{s1}/d_{s2} > 2 \quad (5)$$

Here $d_{s1}$ is the axial distance from the object-side surface of the first lens element to the stop, and $d_{s2}$ is the axial distance from the stop to the image-side surface of the fourth lens element.

Condition (4) gives a definition of the ratio between the distance from the first surface of the first lens element to the stop and the distance from the stop to the final surface of the final lens. As the lower limit of 2 to this condition is not reached, the position of an exit pupil becomes too close to an image, causing insufficient light quantity at the periphery of an image pickup device. As the upper limit of 3 is exceeded, the position of the stop becomes too close to the object side, making it impossible to secure any wide space between the first lens element and the second lens element and, hence, any lens space sufficient for bending the optical system.

Preferably in the present invention, the first and second lens elements should each be of plastics.

Plastic lenses are more sensible to fabrication errors than glass lenses. However, the cost of the first and second lens elements according to the present invention can be cut down by using plastics for the same, because they are less susceptible to deterioration in performance due to fabrication errors. The outside shape of each lens element should be circular in consideration of processing and assembling requirements. However, it is noted that an image pickup device comprises a usually tetragonal photo-receptive surface having a long side and a short side; a light beam actually passing through lens elements in an image pickup optical system takes a non-circular optical path. Accordingly, if the first lens element L101 where the optical path is not bent as yet and the second lens element L102 where the optical path has been bent are each configured in such a way as to have a non-circular, e.g., tetragonal or elliptic outside shape, it is then possible to minimize the space between the lens elements between which the optical path is bent and, hence, make the optical system slimmer. Lenses having non-circular outside shapes are more easily fabricated using plastics rather than using glasses.

Preferably in the image pickup lens of the present invention, a reflecting device having a reflecting surface should be interposed between the first lens element and the second lens element.

As already explained, the present invention enables a suitable space to be provided between the first lens element and the second lens element, so that the reflecting device having a reflecting surface can be disposed at that space, thereby slimming down the image pickup lens in the axial direction incident thereon. Thus, the image pickup lens of the present invention may be used on low-profile electronic image pickup systems such as image pickup systems built in digital cameras and personal digital assistants, for instance, cellular phones and notebook PCs. For that reflecting device having a reflecting surface, any one of front surface mirrors, back-surface mirrors comprising mirror-coated, transparent plane parallel plates, and triangular prisms may be used.

In one specific embodiment of the present invention as shown in FIG. 1, the length (A) of the line of intersection where the plane of incidence including an entrance optical axis for the reflecting surface and a reflection optical axis intersects the object-side surface of the first lens element may be shorter than the length (B) of the line of intersection where a plane vertical to that plane of incidence and including the entrance optical axis intersects the object-side surface of the first lens element.

With this arrangement, it is possible to decrease the space for disposing the reflecting surface and, hence, slim down the phototaking lens. In short, the depth dimension of the reflecting surface depends on the shorter length (A) of the first lens element, ensuring an arrangement fit for the slimming-down of the optical system. Especially because the first lens element is far away from the stop, it should more preferably have a substantially rectangular shape approximate to the shape of a light beam farthest off the optical axis for the purpose of size and weight reductions.

As shown in FIG. 1, the length (C) of the line of intersection where the plane of incidence including an entrance optical axis for the reflecting surface and a reflection optical axis intersects the object-side surface of the second lens element may also be shorter than the length (D) of the line of intersection where the plane vertical to that plane of incidence and including an entrance optical axis for the second lens element intersects the object-side surface of the second lens element.

With this arrangement, it is possible to decrease the space for disposing the reflecting surface and, hence, slimming down the phototaking lens. In short, the depth dimension of the reflecting surface depends on the shorter length (C) of the second lens element, ensuring an arrangement fit for the slimming-down of the optical system. Especially because the second lens element is relatively close to the stop, it should more preferably have an intermediate or, substantially elliptic, shape between the shape of the stop and the shape of the image pickup plane.

The aforesaid image pickup lens, combined with an image pickup device located on the image side thereof, may make up an image pickup system.

By disposing the image pickup device on the image plane of the image pickup lens, it is thus possible to construct an image pickup system. Especially because the image pickup lens of the present invention is of the retrofocus type, an emergent light beam directing toward the image side of the image pickup lens takes an approximately parallel form. For this reason, it is more preferable to use a CCD or other electronic image pickup device as the image pickup device because satisfactory images are then obtainable.

Preferable in that case, the periphery of the first lens element should be configured in such a way as to have varying sizes in the directions corresponding to the longitudinal and lateral directions of the image pickup plane of the image pickup device.

Likewise, it is preferable to configure the periphery of the second lens element in such a way as to have varying sizes in the directions corresponding to the longitudinal and lateral directions of the image pickup plane of the image pickup device.

With the shapes determined corresponding to the image pickup plane, it is possible to save space for the image pickup system.

The image pickup lens of the present invention is favorable for the construction of an image pickup system commensurate with a wide-angle area. In particular, the image pickup lens should preferably be applied to an image pickup system having a half view angle that complies with the following condition:

$$24° < \omega < 40°$$

The half view angle being below the lower limit of 24° to this condition is favorable for correction of aberrations, but this view angle becomes unpractical. As the upper limit of 40° is exceeded, on the other hand, distortion and chromatic aberration of magnification are likely to occur, only to increase in the number of lens elements used.

More preferably for much higher performance, the aforesaid conditions should be set as follows.

The lower limit to condition (1) be set at 13.0 or 15.0;

the upper limit to condition (1) be set at 26.0 or 33.0;

the lower limit to condition (2) be set at 0.40 or 0.60;

the upper limit to condition (2) be set at 0.80 or 1.00;

the upper limit to condition (3) be set at 6.5 or 7.0;

the lower limit to condition (4) be set at 1.3 or 1.6;

the upper limit to condition (4) be set at 2.1 or 2.3;

the lower limit to condition (5) be set at 2.3 or 2.5;

the upper limit to condition (5) be set at 2.7 or 2.8;

the lower limit to condition (A) be set at 2.0 or 2.4;

the upper limit to condition (A) be set at 0.35 or 0.40;

the lower limit to condition (B) be set at −5.0 or −3.0;

the upper limit to condition (B) be set at −2.4 or −2.0;

the lower limit to condition (C) be set at 0.20 or 0.25; and the upper limit to condition (C) be set at 0.33 or 0.40.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENTS

Some examples of the image pickup lens of the present invention, and some examples of an image pickup system using the same are now given.

Figure 1:
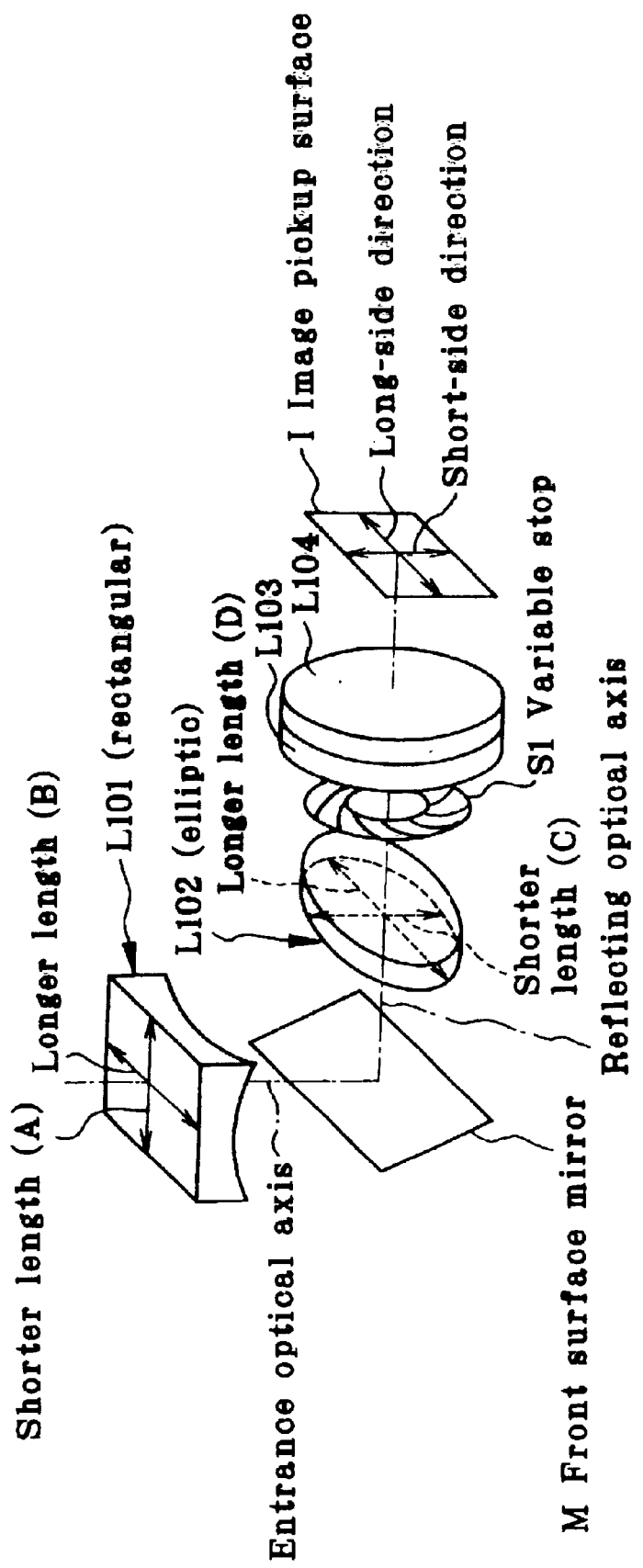
FIG. 1 is illustrative in schematic of the image pickup lens of the present invention, and an optical system portion of an image pickup system using the same.

One embodiment of the image pickup lens of the present invention and an optical system portion of an image pickup system using the same are illustrated schematically in perspective in FIG. 1. The image pickup lens is made up of, in order of incidence of light from a subject, a first lens element L101 having negative refracting power, a front surface mirror M functioning as a reflecting element for bending an optical path through 90°, a second lens element L102 having positive refracting power, a stop S1 located as a variable stop, a third lens element L103 having negative refracting power and a fourth lens element L104 having positive refracting power. The image pickup system is constructed by locating an image pickup device while its image pickup surface I is positioned on the image plane of the image pickup lens.

In this embodiment, the first lens element L101 is configured to have a rectangular (oblong) outside shape in such a way that the length (A) of the line of intersection where the plane of incidence including an entrance optical axis and a reflection optical axis for the reflecting surface of the front surface mirror M intersects the object-side surface of the first lens element L101 is shorter than the length (B) of the line of intersection where a plane vertical to that plane of incidence and including the entrance optical axis intersects the object-side surface of the first lens element L101, and the second lens element L102 is configured to have an elliptic outside shape in such a way that the length (C) of the line of intersection where the plane of incidence including an entrance optical axis and a reflection optical axis, for the reflecting surface of the front surface mirror M intersects the object-side surface of the second lens element L102 is shorter than the length (D) of the line of intersection where a plane vertical to that plane of incidence and including the entrance optical axis intersects the object-side surface of the second lens element L102.

Such an image pickup lens is now explained with reference to Examples 1 and 2, from which the optical path-bending reflecting element is omitted.

Figure 2:
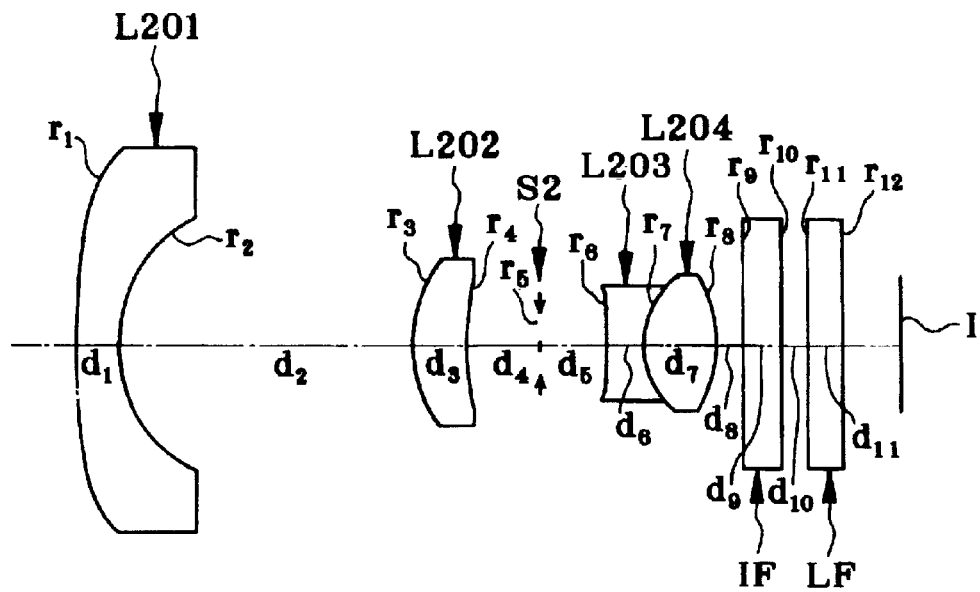
FIG. 2 is illustrative in section of Example 1 of the image pickup lens of the present invention.

As shown in FIG. 2, Example 1 of the image pickup lens is made up of a first lens element L201 having negative refracting power and consisting of a negative meniscus lens element convex on its object side, a second lens element L202 having positive refracting power and consisting of a positive meniscus lens element convex on its object side, a stop S2, a third lens element L203 having negative refracting power and consisting of a double-concave negative lens element and a fourth lens element L204 having positive refracting power and consisting of a double-convex positive lens element cemented to the third lens element L203. Both the first and second lens elements L201 and L202 are formed of plastics, and three aspheric surfaces are used, two at both surfaces of the first lens element L201 and one at the object-side surface of the third lens element L203. Between the fourth lens element L204 and an image pickup surface I there are interposed an infrared cut filter IF and a low-pass filter LF.

Figure 4:
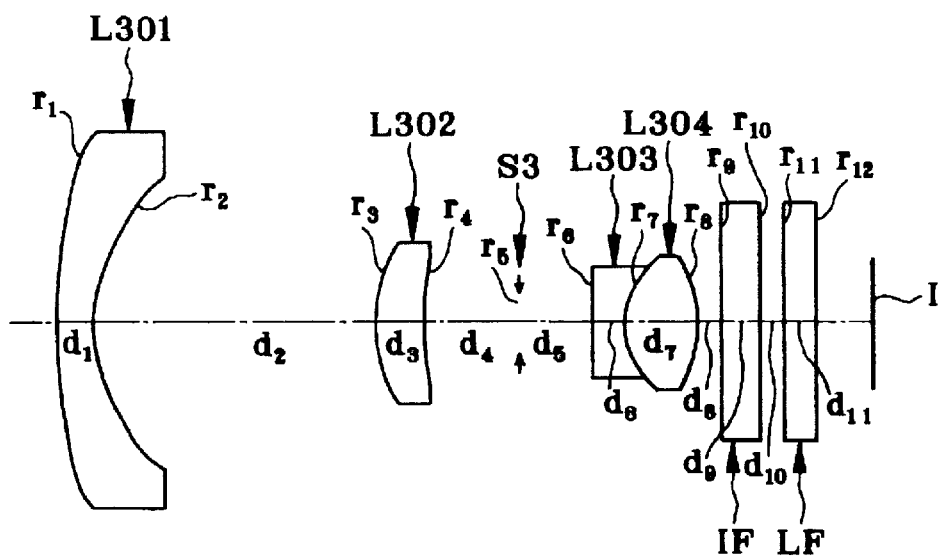
FIG. 4 is illustrative in section of Example 2 of the image pickup lens of the present invention.

As shown in FIG. 4, Example 2 of the image pickup lens is made up of a first lens element L301 having negative refracting power and consisting of a negative meniscus lens element convex on its object side, a second lens element L302 having positive refracting power and consisting of a positive meniscus lens element convex on its object side, a stop S3, a third lens element L303 having negative refracting power and consisting of a double-concave negative lens element and a fourth lens element L304 having positive refracting power and consisting of a double-convex positive lens element cemented to the third lens element L303. Three aspheric surfaces are used, two at both surfaces of the first lens element L301 and one at the object-side surface of the third lens element L303. Between the fourth lens element L304 and an image pickup surface I there are interposed an infrared cut filter IF and a low-pass filter LF.

Enumerated below are the numerical data on Examples 1 and 2. The symbols used hereinafter but not used hereinbefore have the following meanings.

f: the focal length of the image pickup lens,
$F_{NO}$: F-number,
ω: half view angle,
$r_1, r_2, \ldots$: the radius of curvature of each lens surface,
$d_1, d_2, \ldots$: the space between adjacent lens surfaces,
$n_{d1}, n_{d2}, \ldots$: the d-line index of refraction of each lens element, and
$\nu_{d1}, \nu_{d2}, \ldots$: the d-line reference Abbe number of each lens element. Here let x indicate an optical axis with the proviso that the direction of propagation of light is defined as positive and y stand for a direction that intersects orthogonally the optical axis. Then, aspheric shape is given by $$x=(y^2/r)/[1+(1-(K+1)(y/r)^2)^{1/2}]+A_4 y^4+A_6 y^6+A_8 y^8+A_{10} y^{10}$$

where r is a paraxial radius of curvature, K is a conical coefficient, and $A_4$, $A_6$, $A_8$ and $A_{10}$ are the 4th-order, 6th-order, 8th-order and 10th-order aspheric coefficients.

EXAMPLE 1

| f = 2.1 mm | | | |
|---|---|---|---|
| $F_{NO}$ = 2.8 | | | |
| ω = 34° | | | |
| $r_1$ = 17.6663(Aspheric) | $d_1$ = 0.8000 | $n_{d1}$ = 1.52540 | $\nu_{d1}$ = 56.25 |
| $r_2$ = 2.7723(Aspheric) | $d_2$ = 6.0000 | | |
| $r_3$ = 3.0653 | $d_3$ = 1.0000 | $n_{d2}$ = 1.58423 | $\nu_{d2}$ = 30.49 |
| $r_4$ = 7.2363 | $d_4$ = 1.5000 | | |
| $r_5$ = ∞ (Stop) | $d_5$ = 1.3700 | | |
| $r_6$ = 3884.1391(Aspheric) | $d_6$ = 0.7000 | $n_{d3}$ = 1.68893 | $\nu_{d3}$ = 31.07 |
| $r_7$ = 1.8000 | $d_7$ = 1.5000 | $n_{d4}$ = 1.69350 | $\nu_{d4}$ = 53.34 |
| $r_8$ = −2.5864 | $d_8$ = 0.5000 | | |
| $r_9$ = ∞ | $d_9$ = 0.8000 | $n_{d5}$ = 1.51633 | $\nu_{d5}$ = 64.14 |
| $r_{10}$ = ∞ | $d_{10}$ = 0.5000 | | |
| $r_{11}$ = ∞ | $d_{11}$ = 0.7000 | $n_{d6}$ = 1.51633 | $\nu_{d5}$ = 64.14 |
| $r_{12}$ = ∞ | | | |

Aspherical Coefficients
  1st surface
  K=0
  $A_4$=8.3853×10$^{-17}$
  $A_6$=−7.5355×10$^{-12}$
  $A_8$=5.5724×10$^{-6}$
  $A_{10}$=0
  2nd surface
  K=0
  $A_4$=−5.1615×10$^{-9}$ $A_6=-1.5982\times10^{-11}$
$A_8=-1.9701\times10^{-5}$
$A_{10}=0$
6th surface
K=0
$A_4=-1.5704\times10^{-2}$
$A_6=-3.5102\times10^{-3}$
$A_8=-1.2939\times10^{-2}$
$A_{10}=0$
Condition (1)=25.76
Condition (2)=0.567
Condition (3)=6.129
Condition (4)=2.091
Condition (5)=2.605
Condition (A)=0.251
Condition (B)=−2.47
Condition (C)=0.329

EXAMPLE 2

| f = 3 mm  $F_{NO}$ = 2.8  ω = 25.7° | | | | |
|---|---|---|---|---|
| $r_1$ = 8.7557(Aspheric) | $d_1$ = 0.8000 | $n_{d1}$ = 1.52540 | $v_{d1}$ = 56.25 |
| $r_2$ = 3.2988(Aspheric) | $d_2$ = 6.0000 | | |
| $r_3$ = 3.1074 | $d_3$ = 1.0000 | $n_{d2}$ = 1.58144 | $v_{d2}$ = 40.75 |
| $r_4$ = 7.0244 | $d_4$ = 2.0000 | | |
| $r_5$ = ∞ (Stop) | $d_5$ = 1.5189 | | |
| $r_6$ = −66.1397(Aspheric) | $d_6$ = 0.7000 | $n_{d3}$ = 1.68893 | $v_{d3}$ = 31.07 |
| $r_7$ = 1.8000 | $d_7$ = 1.5000 | $n_{d4}$ = 1.69350 | $v_{d4}$ = 53.34 |
| $r_8$ = −2.7565 | $d_8$ = 0.5000 | | |
| $r_9$ = ∞ | $d_9$ = 0.8000 | $n_{d5}$ = 1.51633 | $v_{d5}$ = 64.14 |
| $r_{10}$ = ∞ | $d_{10}$ = 0.5000 | | |
| $r_{11}$ = ∞ | $d_{11}$ = 0.7000 | $n_{d6}$ = 1.51633 | $v_{d6}$ = 64.14 |
| $r_{12}$ = ∞ | | | |

Aspherical Coefficients
 1st surface
 K=0
 $A_4=-1.1316\times10^{-3}$
 $A_6=-2.6074\times10^{-4}$
 $A_8=1.8543\times10^{-5}$
 $A_{10}=0$
 2nd surface
 K=0
 $A_4=-3.9941\times10^{-3}$
 $A_6=-5.2445\times10^{-4}$
 $A_8=1.4191\times10^{-5}$
 $A_{10}=0$
 6th surface
 K=0
 $A_4=-1.6175\times10^{-2}$
 $A_6=-8.5626\times10^{-4}$
 $A_8=1.1676\times10^{-3}$
 $A_{10}=0$
Condition (1)=15.5
Condition (2)=0.74
Condition (3)=4.506
Condition (4)=1.705
Condition (5)=2.635
Condition (A)=0.342
Condition (B)=2.59
Condition (C)=0.283

Figure 3:
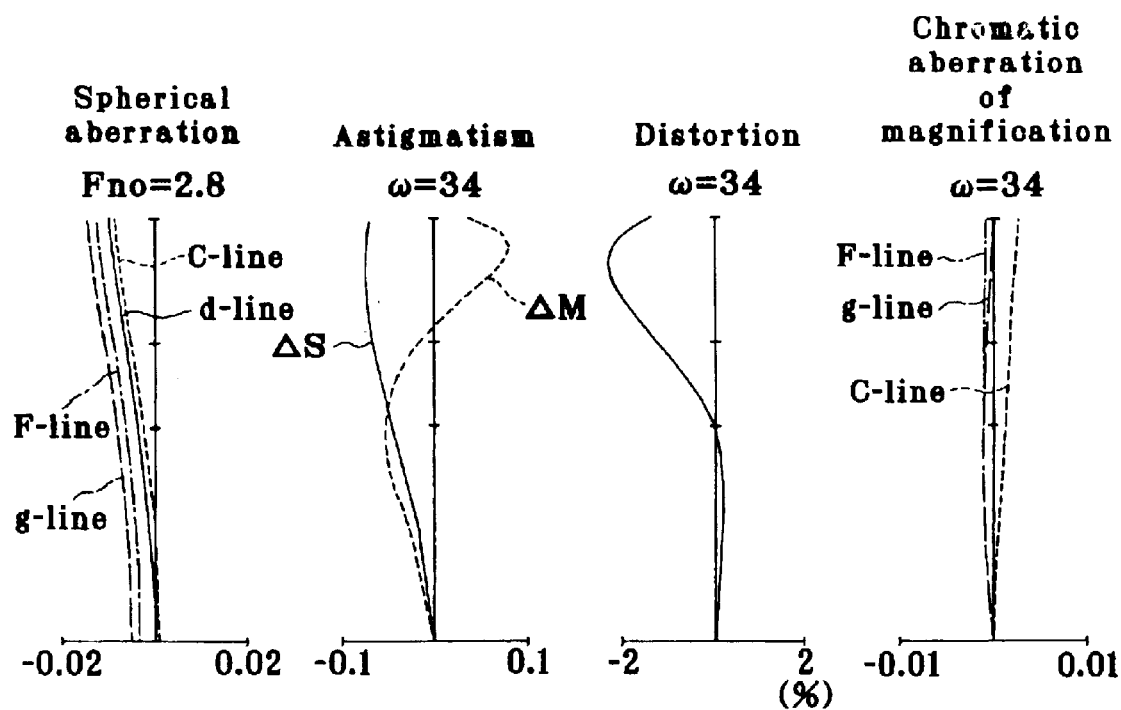
FIG. 3 is an aberration diagram for Example 1 of the image pickup lens of the present invention.
Figure 5:
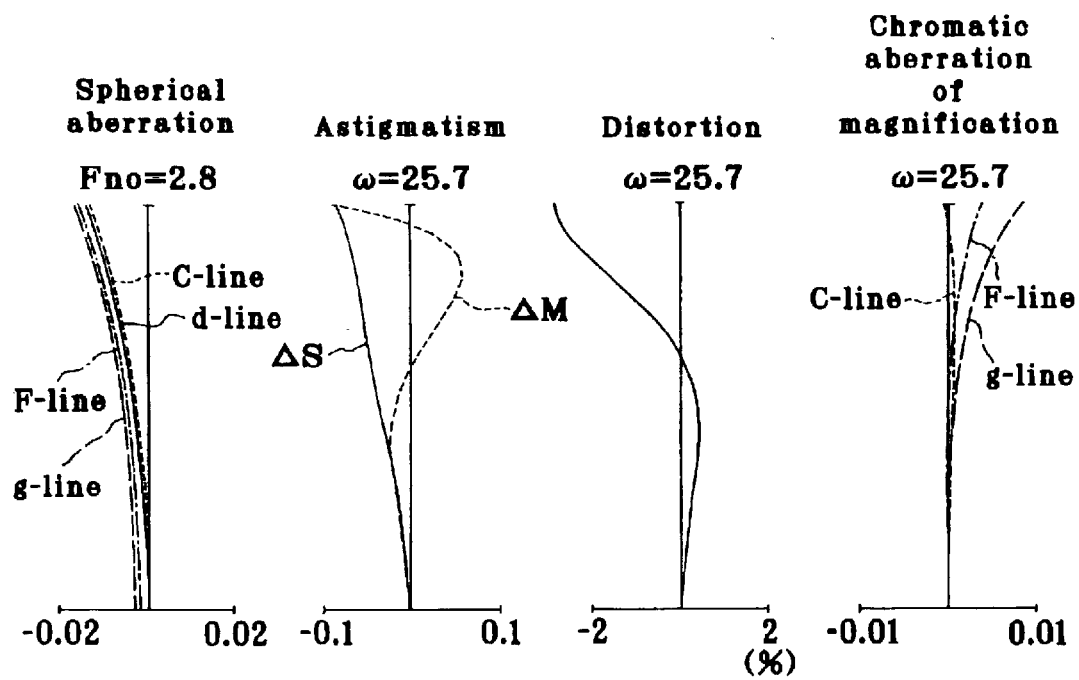
FIG. 5 is an aberration diagram for Example 2 of the image pickup lens of the present invention.

Aberration diagrams for Examples 1 and 2 upon focused on a point at infinity are shown in FIGS. 3 and 5.

The present image pickup lens constructed as mentioned above may be used with phototaking equipments designed to form an object image by an image pickup lens so that the image can be received at a CCD or other image pickup device for phototaking purposes, especially digital cameras or video cameras, or personal digital assistants such as PCs and phones, in particular easy-to-carry cellular phones, as embodied below.

Figure 6:
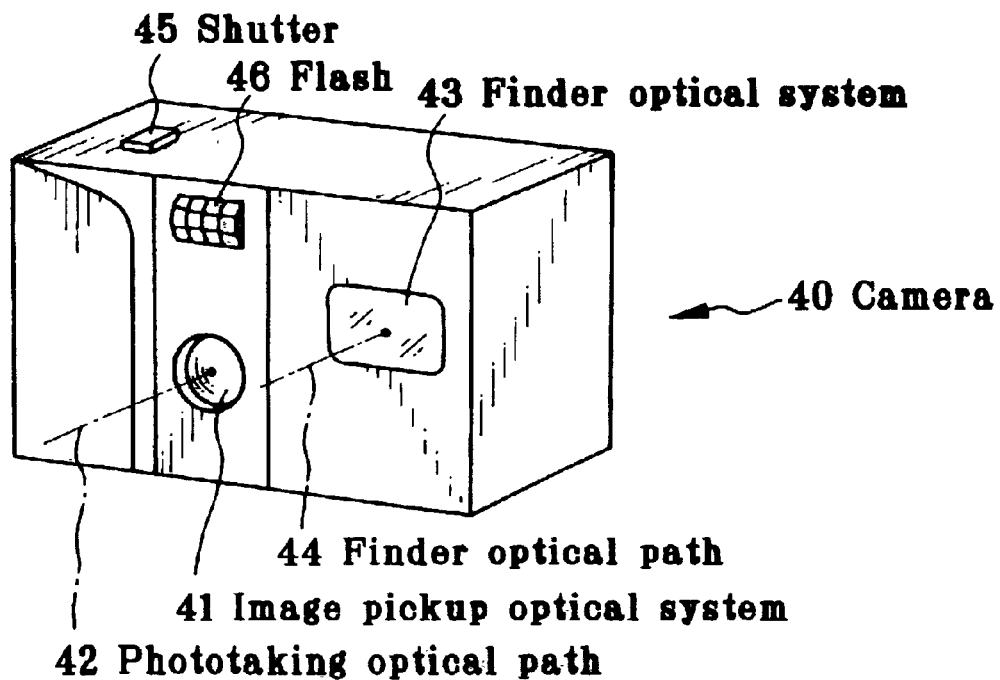
FIG. 6 is a front perspective view illustrative of the outward appearance of a digital camera in which the image pickup lens of the present invention is built.
Figure 7:
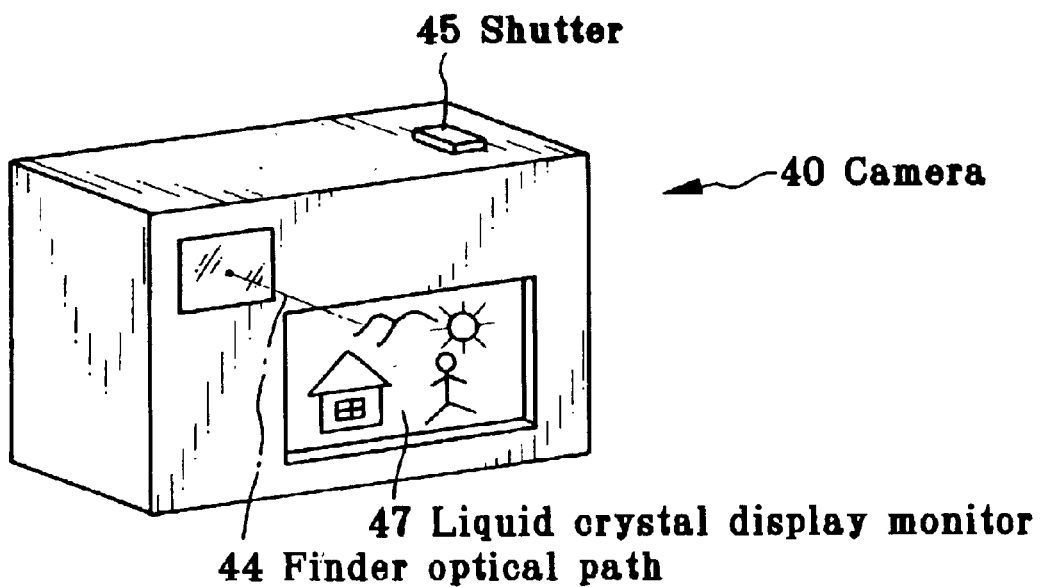
FIG. 7 is a rear perspective view of the FIG. 6 digital camera.
Figure 8:
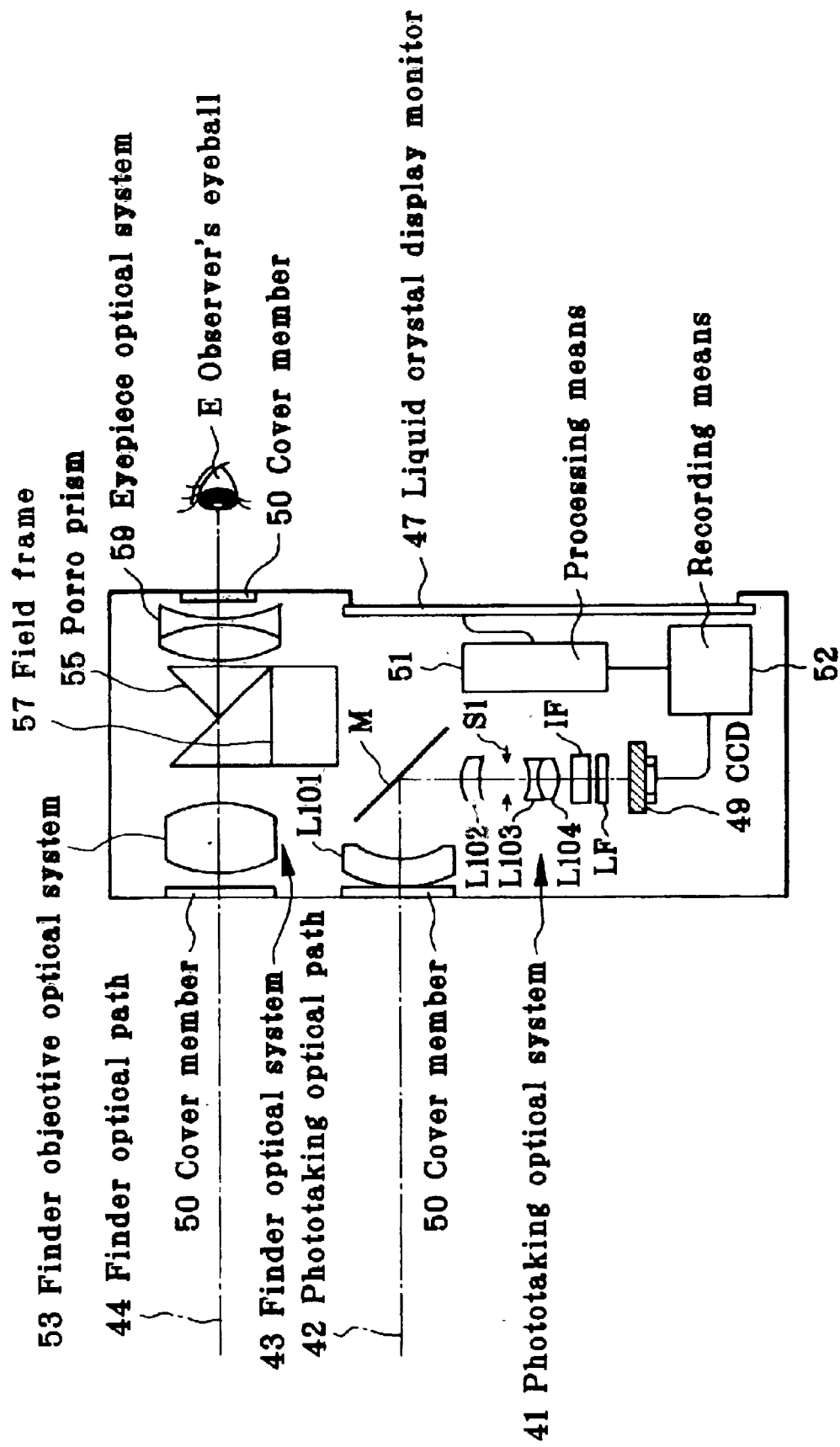
FIG. 8 is a sectional view of the FIG. 6 digital camera.

FIGS. 6, 7 and 8 are illustrative in conception of a digital camera's phototaking optical system 41 in which the image pickup lens of the present invention is built. FIGS. 6 and 7 are a front and a rear perspective view of the outside appearance of a digital camera 40, respectively, and FIG. 8 is a sectional view of the makeup of the digital camera 40. In this embodiment, the digital camera 40 comprises a phototaking optical system 41 including a phototaking optical path 42, a finder optical system 43 including a finder optical path 44, a shutter 45, a flash 46, a liquid crystal display monitor 47, etc. As the shutter 45 mounted on the upper portion of the camera 40 is pressed down, phototaking takes place through the phototaking optical system 41, for instance, the image pickup lens shown in FIG. 2. Then, an object image formed by the phototaking optical system 41 is formed on the image pickup surface of a CCD 49 via an infrared cut filter IF and a low-pass filter LF. The object image received at CCD 49 is shown as an electronic image on the liquid crystal display monitor 47 mounted on the back side of the camera via processing means 51. The processing means 51 may be connected with recording means 52 to record therein phototaken electronic images. It is here noted that the recording means 52 may be provided separately from the processing means 51 or, alternatively, it may be designed such that images are written or recorded in floppy disks memory cards, MOs or the like. Still alternatively, a silver-halide camera having a silver-halide film loaded therein may be used in place of CCD 49.

On the finder optical path 44 there is located a finder objective optical system 53. An object image formed by the finder objective optical system 53 is formed on a field frame 51 of a Porro prism 55 that is an image-erecting member. In the rear of the Porro prism 55 there is located an eyepiece optical system 59 for guiding an erected image to an observer's eyeball E. Further, three cover members 50 are provided, two on the entrance sides of the phototaking optical system 41 and finder objective optical system 53 and one on the exit side of the eyepiece optical system 59.

The thus constructed digital camera 40 can have improved performance at low cost, because the phototaking optical system 41 used ensures wide-angle phototaking and a back focus large enough to receive filters, etc., and is fast with well-corrected aberrations.

In the FIG. 8 embodiment, plane-parallel plates may be used as the cover members 50; however, powered lens elements may be used instead.

Figure 9:
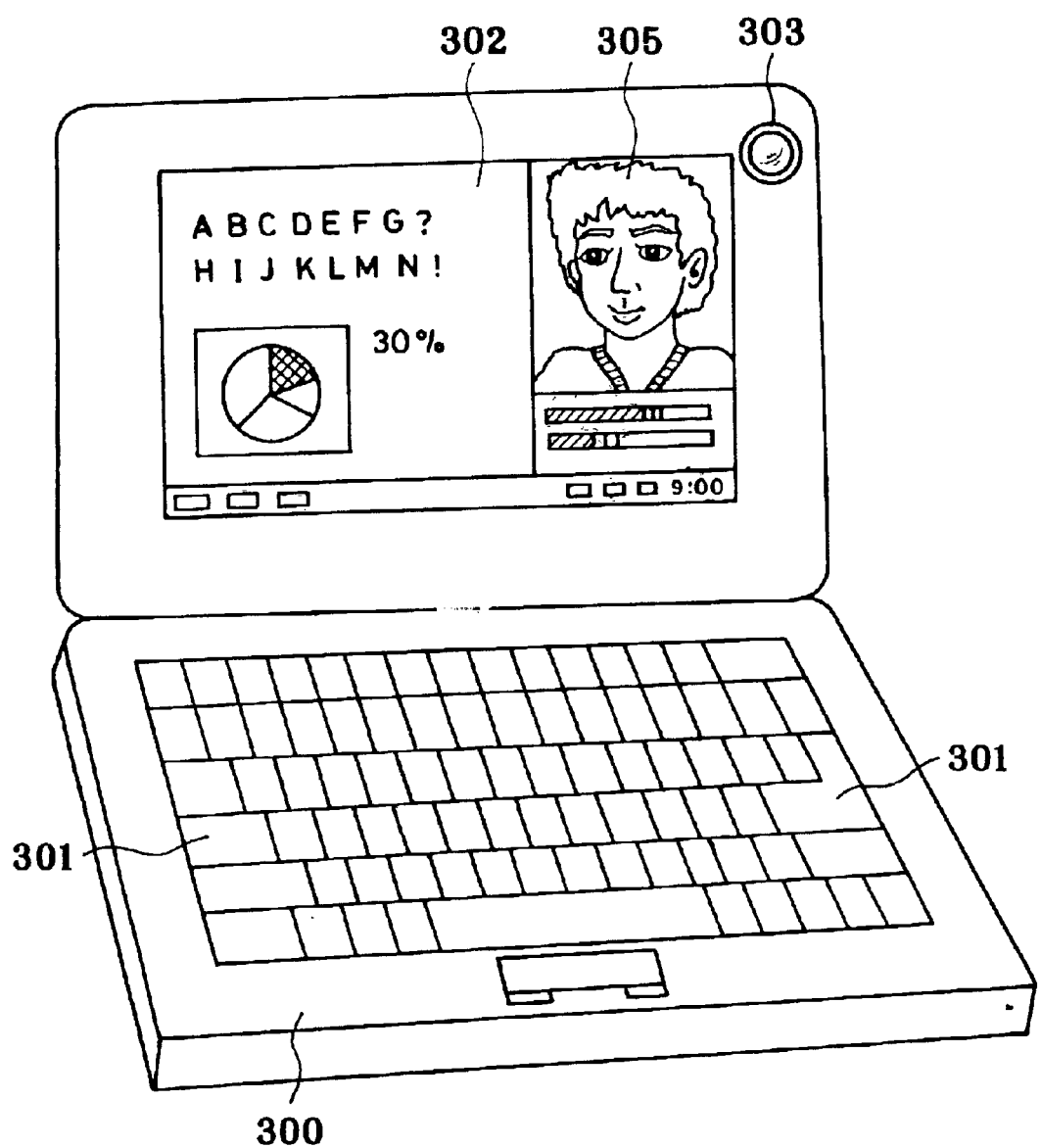
FIG. 9 is a front perspective view of an uncovered PC in which the image pickup lens of the present invention is built as an objective optical system.
Figure 10:
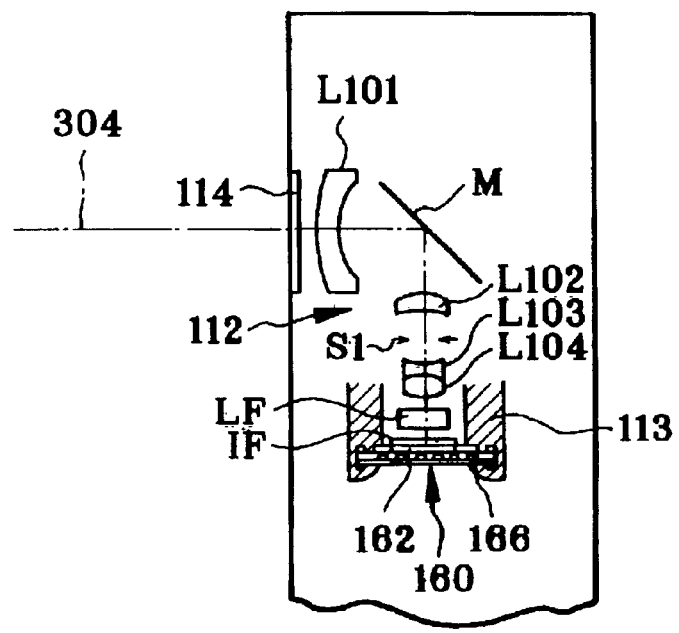
FIG. 10 is a sectional view of a phototaking optical system for the PC.
Figure 11:
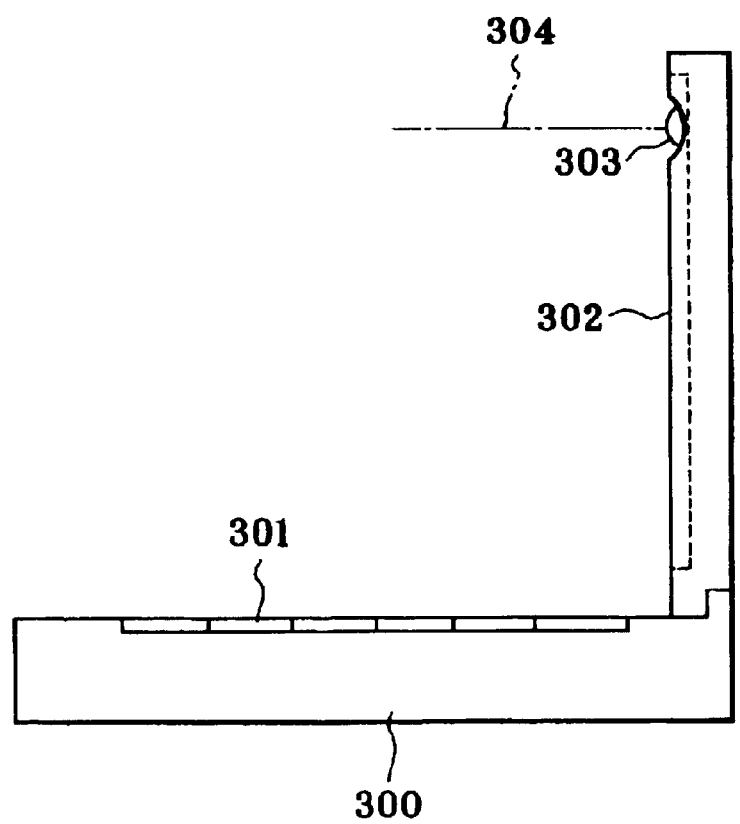
FIG. 11 is a side view of FIG. 9.

A personal computer that is one example of personal digital assistants in which the image pickup lens of the present invention is built as part of an objective optical system is now explained with reference to FIG. 9, 10 and 11. FIG. 9 is a front perspective view of a personal computer 300 that remains uncovered, FIG. 10 is a sectional view of a phototaking optical system 303 built in PC 300, and FIG. 11 is a side view of FIG. 9. As depicted in FIGS. 9 to 11, PC 300 comprises a keyboard 301 that enables an operator to enter information therein from outside, information processing means and recording means (not shown), a monitor 302 for showing information to the operator, and a phototaking optical system 303 for phototaking images of the operator per se and surroundings. Here the monitor 302 may be a reflection type liquid crystal display device designed to be illuminated from its back side by a backlight (not shown), a CRT display or the like. As shown, the phototaking monitor 303 is built in a right upper portion of the monitor 302; however, it may be located at any desired position around the monitor 302 or the keyboard 301.

The phototaking optical system 303 comprises on a phototaking optical path 304 an objective lens 112 comprising the image pickup lens of the present invention, for instance, one shown in FIG. 2 and an image pickup device chip 162 for receiving an image, all built in the personal computer 300.

Here an infrared cut filter IF is additionally applied onto the image pickup device chip 162, so that a monolithic image pickup unit 160 can be formed. Since the monolithic image pickup unit 160 can be snapped in the rear end of a lens barrel 113 of the objective lens 112 in one-touch operation, any centering or alignment of the objective lens 112 with respect to the image pickup device chip 162 can be dispensed with; that is, they can be assembled together easily. At the end (not shown) of the lens barrel 113 there is provided a cover glass 114 for protection of the objective lens 112.

An object image received at the image pickup device chip 162 is entered in processing means of PC 300 via a terminal 166, so that it is shown as an electronic image on the monitor 302. As an example, FIG. 9 is illustrative of an image 305 phototaken of the operator. This image 305 may be so processed by the processing means that it can be shown on a personal computer at the other end at a remote site via the Internet or a telephone circuit.

Figure 12A:
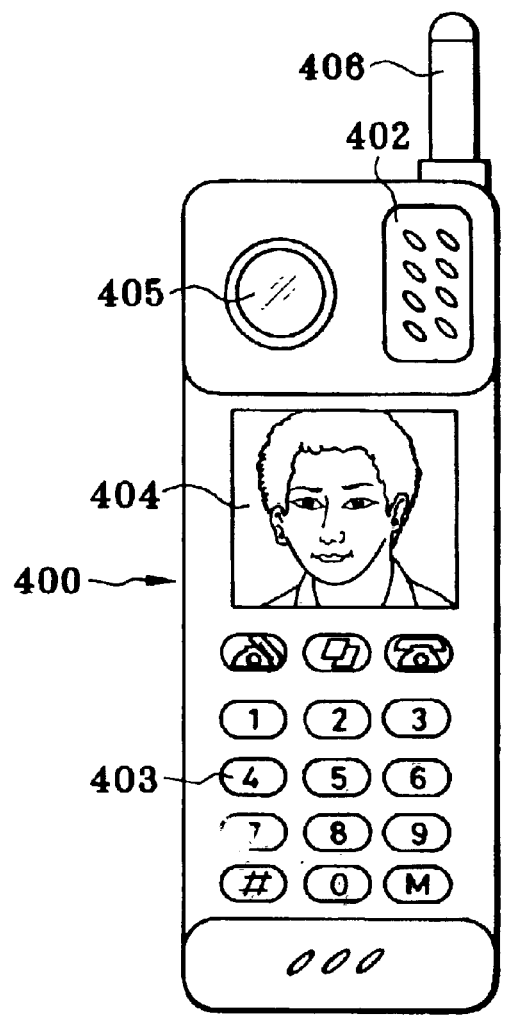
FIGS. 12(a), 12(b) and 12(c) are a front and a side view of a cellular phone in which the image pickup lens of the present invention is built as an objective optical system, and a sectional view of a phototaking optical system for the same, respectively.
Figure 12B:
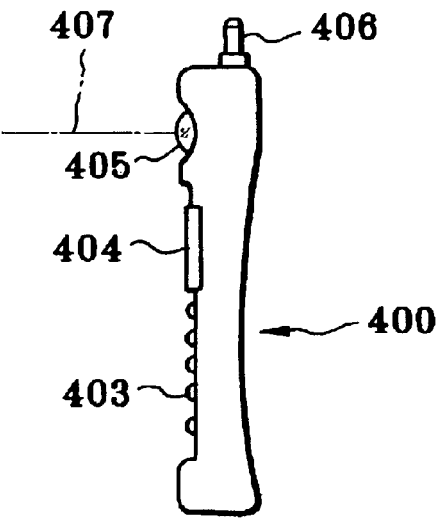
Figure 12C:
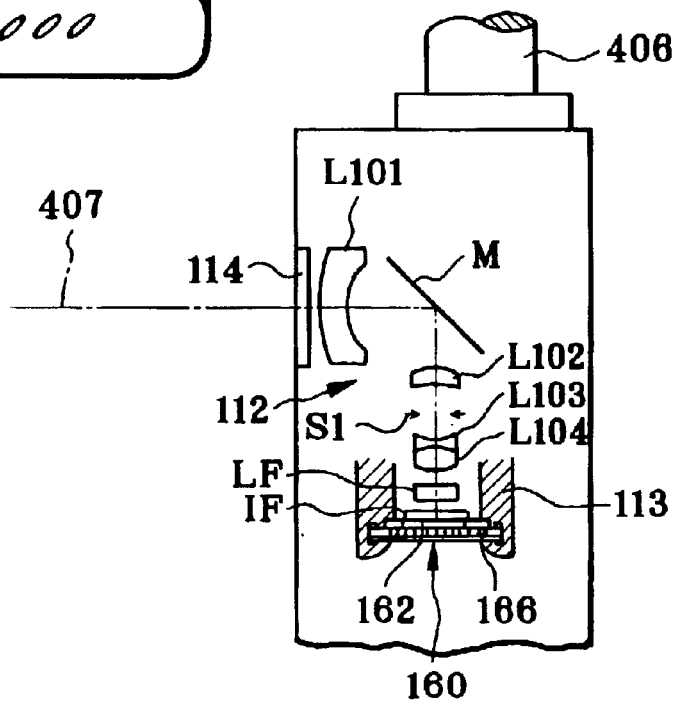

A telephone, especially a convenient-to-carry cellular phone that is one example of personal digital assistants in which the image pickup lens of the present invention is built as a phototaking optical system is now explained with reference to FIGS. 12(a), 12(b) and 12(c). FIGS. 12(a) and 12(b) are a front and a side view of a cellular phone 400, respectively, and FIG. 12(c) is a sectional view of a phototaking optical system. As depicted in FIGS. 12(a) to 12(c), the cellular phone 400 comprises a microphone 401 for entering the voice of an operator as information, a speaker 402 for producing the voice of a person at the other end, an input dial 403 with which the operator enters information, a monitor 404 for showing images phototaken of the operator per se, the person on the other end or the like, telephone numbers, etc., a phototaking optical system 405, an antenna 406 for transmission and reception of communication waves, and processing means (not shown) for processing of image information, communications information, input signals, etc. Here the monitor 404 is a liquid crystal display device, and the positions of these parts are not necessarily limited to those shown in FIGS. 12(a) to 12(c). The phototaking optical system 405 comprises on a photo-taking optical path 407 an objective lens 112 made up of the image pickup lens of the present invention, for instance, one shown in FIG. 2, and an image pickup device chip 162 for receiving an object image. These are built in the cellular phone 400.

Here an infrared cut filter IF is additionally applied onto the image pickup device chip 162, so that a monolithic image pickup unit 160 can be formed. Since the monolithic image pickup unit 160 can be snapped in the rear end of a lens barrel 113 of the objective lens 112 in one-touch operation, any centering or alignment of the objective lens 112 with respect to the image pickup device chip 162 can be dispensed with; that is, they can be assembled together easily. At the end (not shown) of the lens barrel 113 there is provided a cover glass 114 for protection of the objective lens 112.

An object image received at the phototaking device chip 162 is entered in processing means (not shown) via a terminal 166 so that it can be shown as an electronic image on the monitor 404 and/or a monitor at the other end. To transmit the image to the person at the other end, the signal processing means further has a signal processing function of converting information about the object image received at the image pickup device chip 162 to transmittable signals.

As can be appreciated from the foregoing, the present invention can provide an image pickup lens that is made up of a reduced number of lens elements with a bendable optical path, and so is compatible with miniature image pickup equipments used with cellular phones, etc.

I claim:

1. An image pickup lens, which comprises, in order from an object side thereof, a first lens element having negative refracting power, a second lens element having positive refracting power, a stop, a third lens element having negative refracting power and a fourth lens element having positive refracting power, wherein lens elements having refracting power due to refraction are defined only by said first to fourth lens elements and the following conditions (1) and (2) are satisfied:

$$50 > \nu_{d1} - \nu_{d2} > 10 \tag{1}$$

$$2 > f/f_3 > 0.35 \tag{2}$$

where $\nu_{d1}$ is a d-line reference Abbe number of the first lens element, $\nu_{d2}$ is a d-line reference Abbe number of the second lens element, f is a focal length of the image pickup lens, and $f_3$ is a composite focal length of the third and fourth lens elements.

2. The image pickup lens according to claim 1, wherein said third lens element and said fourth lens element are cemented together.

3. The image pickup lens according to claim 1, wherein said second lens element is a positive meniscus lens that is concave on an image side thereof.

4. The image pickup lens according to claim 3, wherein said second lens element satisfies the following conditions (A) and (B):

$$0.45 > f/f_2 > 0.15 \tag{A}$$

$$-1.1 > (r_{21} + r_{22})/(r_{21} - r_{22}) > -10.0 \tag{B}$$

where $f_2$ is a focal length of the second lens element, $r_{21}$ is an axial radius of curvature of an object-side surface of the second lens element, and $r_{22}$ is an axial radius of curvature of an image-side surface of the second lens element.

5. The image pickup lens according to claim 1, wherein said first lens element satisfies the following condition (C):

$$0.50 > f/f_1 > 0.15 \tag{C}$$

where is $f_1$ is a focal length of the first lens element.

6. The image pickup lens according to claim 1, which further satisfies the following conditions (3) and (4):

$$8 > dz/f > 4.5 \tag{3}$$

$$2.5 > d_{12}/d_{23} > 1 \tag{4}$$

where $d_{12}$ is an axial distance from an image-side surface of the first lens element to an object-side surface of the second lens element, $d_{23}$ is an axial distance from an image-side surface of the second lens element to an object-side surface of the third lens element, and dz is an axial distance from an object-side surface of the first lens element to an image-side surface of the fourth lens element.

7. The image pickup lens according to claim 1, which further satisfies the following condition (5):

$$3 > d_{s1}/d_{s2} > 2 \quad (5)$$

where $d_{s1}$ is an axial distance from an object-side surface of the first lens element to the stop, and $d_{s2}$ is an axial distance from the stop to an image-side surface of the fourth lens element.

8. The image pickup lens according to claim 1, wherein said first lens element and said second lens element are each formed of a plastic material.

9. The image pickup lens according to claim 1, wherein between said first lens element and said second lens element there is interposed a reflecting device having a reflecting surface.

10. The image pickup lens according to claim 9, wherein a length of line of intersection where an entrance surface including an entrance optical axis and a reflection optical axis for said reflecting surface intersects an object-side surface of said first lens element is shorter than a length of line of intersection wherein a surface that is vertical to said reflecting surface and including said reflection optical axis intersects the object-side surface of said first lens element.

11. The image pickup lens according to claim 9, wherein a length of line of intersection where an entrance surface including an entrance optical axis and a reflection optical axis for said reflecting surface intersects an object-side surface of said second lens element is shorter than a length of line of intersection wherein a surface that is vertical to said reflecting surface and including an entrance optical axis for said second lens element intersects the object-side surface of said second lens element.

12. An image pickup system, which comprises an image pickup lens as recited in claim 1 and an image pickup device located on an image side thereof.

13. The image pickup system according to claim 12, wherein an outer periphery of said first lens element is configured to have varying sizes in directions corresponding to a longitudinal and a lateral direction of an image pickup surface of said image pickup device.

14. The image pickup system according to claim 12, wherein an outer periphery of said second lens element is configured to have varying sizes in directions corresponding to a longitudinal and a lateral direction of an image pickup surface of said image pickup device.

15. The image pickup lens according to claim 2, wherein, wherein between said first lens element and said second lens element there is interposed a reflecting device having a reflecting surface.

16. The image pickup lens according to claim 15, wherein a length of line of intersection where an entrance surface including an entrance optical axis and a reflection optical axis for said reflecting surface intersects an object-side surface of said first lens element is shorter than a length of line of intersection wherein a surface that is vertical to said reflecting surface and including said reflection optical axis intersects the object-side surface of said first lens element.

17. The image pickup lens according to claim 15, wherein a length of line of intersection where an entrance surface including an entrance optical axis and a reflection optical axis for said reflecting surface intersects an object-side surface of said second lens element is shorter than a length of line of intersection wherein a surface that is vertical to said reflecting surface and including an entrance optical axis for said second lens element intersects the object-side surface of said second lens element.

18. An image pickup system, which comprises an image pickup lens as recited in claim 9 and an image pickup device located on an image side thereof.

19. The image pickup system according to claim 18, wherein an outer periphery of said first lens element is configured to have varying sizes in directions corresponding to a longitudinal and a lateral direction of an image pickup plane of said image pickup device.

20. The image pickup system according to claim 9, wherein an outer periphery of said second lens element is configured to have varying sizes in directions corresponding to a longitudinal and a lateral direction of an image pickup plane of said image pickup device.

* * * * *